United States Patent [19]

Gladrow

[11] 4,164,465
[45] Aug. 14, 1979

[54] HYDROCARBON CRACKING WITH CATALYST CONTAINING A CO OXIDATION PROMOTER IN ULTRA-STABLE ZEOLITE PARTICLES

[75] Inventor: Elroy M. Gladrow, Baton Rouge, La.

[73] Assignee: Exxon Research & Engineering Co., Florham Park, N.J.

[21] Appl. No.: 875,175

[22] Filed: Feb. 3, 1978

Related U.S. Application Data

[62] Division of Ser. No. 698,902, Jun. 23, 1976, Pat. No. 4,097,410.

[51] Int. Cl.$^2$ .................. C10G 11/04; B01J 29/12; B01J 23/56
[52] U.S. Cl. .................. 208/120; 252/455 Z; 252/477 R
[58] Field of Search .................. 208/113–121; 252/416–417

[56] References Cited

U.S. PATENT DOCUMENTS

| | | | |
|---|---|---|---|
| 3,293,192 | 12/1966 | Maher et al. | 252/430 |
| 3,364,136 | 1/1968 | Chen et al. | 208/120 |
| 3,758,403 | 9/1973 | Rosinski et al. | 208/120 |
| 3,788,977 | 1/1974 | Dolbear et al. | 208/120 |
| 3,804,747 | 4/1974 | Kimberlin et al. | 208/120 |
| 3,894,934 | 7/1975 | Owen et al. | 208/78 |
| 3,925,195 | 12/1975 | Scherzer et al. | 208/120 |
| 3,926,780 | 12/1975 | Ward | 208/120 X |
| 4,072,600 | 2/1978 | Schwartz | 208/120 |

*Primary Examiner*—Delbert E. Gantz
*Assistant Examiner*—G. E. Schmitkons
*Attorney, Agent, or Firm*—Roy J. Ott; Edward H. Mazer

[57] ABSTRACT

A cracking catalyst for promoting the oxidation of carbon monoxide to carbon dioxide during regeneration of the catalyst by the burning of coke therefrom, comprises two distinct crystalline aluminosilicate zeolite particles embedded in an inorganic porous oxide matrix material. The first zeolite is the ultra-stable variety of Y-type zeolite which contains a CO oxidation promoter, such as a Group VIII metal or compound thereof. The second zeolite is a rare earth metal-containing zeolite. A preferred catalyst comprises an ultrastable Y-type zeolite containing Pt and/or Pd and a rare earth metal exchanged X- or Y-type zeolite, which zeolites are embedded in a silica-alumina or clay matrix.

10 Claims, No Drawings

HYDROCARBON CRACKING WITH CATALYST CONTAINING A CO OXIDATION PROMOTER IN ULTRA-STABLE ZEOLITE PARTICLES

This is a division of application Ser. No. 698,902, filed June 23, 1976 now U.S. Pat. 4,097,410.

BACKGROUND OF THE INVENTION

1. Field of the Invention

This invention relates to a catalyst composition, a method of making the catalyst, and its use in the catalytic conversion of hydrocarbon oils. More particularly, the invention is concerned with a fluid cracking catalyst comprising crystalline aluminosilicate zeolites, an inorganic oxide matrix and a metal which promotes the oxidation of carbon monoxide to carbon dioxide during regeneration of the catalyst by the burning of coke therefrom.

2. Description of the Prior Art

Various processes such as cracking, hydrocracking, etc. are known for the conversion of hydrocarbons to lower molecular weight products. The catalytic cracking of heavy petroleum fractions is one of the major refining operations employed in the conversion of crude petroleum oils to desirable fuel products such as heating oils and high octane gasoline. Illustrative of "fluid" catalytic conversion processes is the fluid catalytic cracking process wherein suitably preheated high molecular weight hydrocarbon liquids and vapors are contacted with hot, finely-divided, solid catalyst particles, either in a fluidized bed reactor or in an elongated riser reactor, and maintained at an elevated temperature in a fluidized or dispersed state for a period of time sufficient to effect the desired degree of cracking to lower molecular weight hydrocarbons.

In the catalytic process, some non-volatile carbonaceous material, or "coke", is deposited on the catalyst particles. As coke builds up on the catalyst, the activity of the catalyst for cracking and the selectivity of the catalyst for producing desirable products diminish. The catalyst particles may recover a major proportion of their original activity by removal of most of the coke by a suitable regeneration process. Catalyst regeneration is accomplished by burning the coke deposits from the catalyst surface with an oxygen-containing gas, such as air. Many regeneration techniques are practiced commercially whereby a significant restoration of catalyst activity is achieved. The burning of coke deposits from the catalysts requires a large volume of oxygen or air and produces substantial quantities of CO and $CO_2$. Ordinarily, the regeneration is conducted at a temperature ranging from about 1050° to about 1250° F. The effect of any increase in temperature is reflected in an increased rate of combustion of carbon and a more complete removal of carbon, or coke, from the catalyst particles.

A major problem often encountered in the practice of fluid catalyst regeneration is the phenomenon known as "afterburning", which is descriptive of the further combustion of CO to $CO_2$. The operators of fluid catalyst regenerators avoid afterburning because it could lead to very high temperatures which are damaging to equipment and possibly to the catalyst particles.

More recently, as operators have sought to raise regenerator temperatures for various reasons, elaborate arrangements have also been developed for control of regenerator temperatures at the point of incipient afterburning by suitable means for control of the oxygen supplied to the regenerator. However, with the control of afterburning, the flue gas from catalyst regenerators usually contains very little oxygen and a substantial quantity of CO and $CO_2$. In order to substantially eliminate the CO from the flue gas and to recover heat energy from the combustion of CO to $CO_2$, the regenerator flue gas is generally sent to a CO boiler wherein the combustion of CO is performed.

There has appeared in the literature, e.g., U.S. Pat. Nos. 2,382,382 and 3,563,911, various techniques for substantially eliminating both uncontrolled afterburning and the presence of CO in the regenerator effluent flue gas. These techniques generally involve the use of relatively high regeneration temperatures, e.g., 1275°–1400° F., and the presence of relatively high concentrations of $O_2$ in the regenerator so that there is substantially complete combustion of the spent catalyst coke to $CO_2$ in the regeneration vessel.

It has also been disclosed in the literature, e.g., U.S. Pat. Nos. 2,414,002; 2,436,927; 2,647,860; 3,650,990 and 3,788,977, that the presence of CO in the regenerator effluent gas from a catalytic cracking operation can be substantially reduced by incorporating a small amount of a CO oxidation promoter in the cracking catalyst composition. For example, cracking catalyst composites consisting of a crystalline aluminosilicate zeolite, a silica-alumina matrix and a small amount of platinum or palladium are known to produce relatively small amounts of CO during the regeneration thereof. Catalysts prepared in accordance with the present invention have improved characteristics as compared to the prior art cracking catalysts.

SUMMARY OF THE INVENTION

A hydrocarbon conversion catalyst for promoting the oxidation of carbon monoxide to carbon dioxide during regeneration of the catalyst by the burning of coke therefrom, which comprises (a) the ultra-stable variety of Y-type zeolite containing a CO oxidation promoter, (b) a rare earth metal-containing zeolite, and (c) an inorganic porous oxide matrix material.

DETAILED DESCRIPTION OF THE INVENTION

The catalyst of the invention comprises a metal or compound thereof which promotes the combustion of CO to $CO_2$ under conditions which are employed to regenerate the spent catalyst by burning the coke deposited thereon in the presence of oxygen. Accordingly, the catalyst will contain one or more metal (or compounds thereof) CO oxidation promoters selected from Periods 5 and 6 of Group VIII of the Periodic Table (Handbook of Chemistry and Physics, 38th Ed., 1957), rhenium, chromium and manganese or their compounds. Specific examples of such metals include platinum, palladium, rhenium, iridium, ruthenium, rhodium, osmium, manganese, etc. The aforedescribed metals may also be present in the oxidized state of an oxide, sulfide, or other.

The inorganic porous oxide which is used as the matrix in the catalyst composition of the invention will include any of the readily available porous materials such as alumina, boria, silica, chromia, magnesia, zirconia, titania, the like, and mixtures thereof. These materials may also include one or more of the various well known clays such as montmorillonite, kaolin, halloysite, bentonite, attapulgite, and the like. Preferably, the inorganic porous oxide will be one or more of the conventional siliceous varieties containing a major amount of silica and a minor amount of an oxide of at least one metal in Groups II-A, III-A and IV-B of the Periodic Table (Handbook of Chemistry and Physics, 38th Ed., 1957). Representative materials include silica-alumina, silica-magnesia, silica-zirconia, silica-thoria, silica-titania, silica-alumina-zirconia, magnesia, etc. The most preferred inorganic porous oxide matrix material is silica-alumina. As is generally known, these materials are typically prepared from silica hydrogel or hydrosol, which is mixed with alumina to secure the desired silica-alumina composition. The alumina content will typically range from about 5 to 40 wt. % with the preferred composition having an alumina content of about 10 to 35 wt. %. Various procedures are described in the literature for making silica-alumina, e.g., U.S. Pat. Nos. 2,908,635 and 2,844,523.

The crystalline aluminosilicate zeolites used in the catalyst composition of the present invention are well known and conventionally used in hydrocarbon conversion processes. The crystalline aluminosilicate zeolites, commonly referred to as "molecular sieves", are characterized by their highly ordered crystalline structure and uniformly dimensioned pores, and are distinguishable from each other on the basis of composition, crystal structure, adsorption properties, and the like. In general, the crystalline aluminosilicate zeolites will have uniform pore openings of about 3–15 Angstrom units, preferably about 6–13 Angstrom units. These values refer to the effective pore diameter of the pore openings, i.e., the diameter at the conditions of use capable of substantially admitting entry to smaller size molecules while substantially excluding larger size molecules.

The aforedescribed CO oxidation promoters are incorporated into a crystalline aluminosilicate zeolite which is commonly known as "ultra-stable" faujasite or Y-type zeolite. These ultra-stable zeolites are well known and conventionally used in various conversion processes. They are described, for example, in U.S. Pat. Nos. 3,133,006; 3,293,192 and 3,402,996 and the publication, Society of Chemical Engineering (London) Monograph Molecular Sieves, pp. 186 (1968) by C. V. McDaniel and P. K. Maher, all of which are incorporated herein by express reference thereto. In general, "ultra-stable" refers to a Y-type zeolite which is highly resistant to degradation of crystallinity by high temperatures and steam treatment and is characterized by an $R_2O$ content (where R is Na, K, or any other alkali metal ion) of less than 1 wt. % and a unit cell size less than 24.50 Å (usually in the range of 24.2 to 24.45 Å) and an $SiO_2/Al_2O_3$ mol ratio in the range of 3.5–7 or higher. The ultra-stable form of the Y-type zeolite is obtained primarily by the virtual elimination of the alkali metal ion and the resulting unit cell shrinkage during the alkali metal removal steps. In other words, the ultra-stable zeolite is identified both by the smaller unit cell and the lack of alkali metal in the crystal structure.

As is generally known, the ultra-stable form of the Y-type zeolite can be prepared by successively base-exchanging a Y-type zeolite with an aqueous solution of an ammonium salt, such as ammonium nitrate, until the alkali metal content of the Y-type zeolite is reduced to less than about 5 wt. %. The base-exchanged zeolite is then calcined at a temperature of 1000° F. to 1500° F. for several hours, cooled and thereafter again successively base-exchanged with an aqueous solution of an ammonium salt until the alkali metal content is reduced to less than 1 wt. %, followed by washing and calcining again at a temperature of 1000° to 1500° F. to produce the ultra-stable zeolite Y. This sequence of ion exchange and heat treatment results in the virtual elimination of the alkali metal content of the original zeolite and results in unit cell shrinkage which are believed to lead to the ultra high stability of the resultant Y-type zeolite.

The second zeolite component of the catalyst composition of the invention includes both the naturally occurring and synthetic crystalline aluminosilicate zeolites which may be combined with rare earth metal compounds. The naturally occurring zeolites include such materials as faujasite, mordenite, erionite, chabazite, and the like. Synthetically produced zeolites include such materials as zeolite A (U.S. Pat. No. 2,882,243), zeolite X (U.S. Pat. No. 2,882,244), zeolite K-G (U.S. Pat. No. 3,055,654), zeolite ZK-5 (U.S. Pat. No. 3,247,195), zeolite Y (U.S. Pat. No. 3,130,007), etc. The preferred crystalline aluminosilicates which are incorporated with rare earth metals or compounds include synthetic faujasite or zeolites X and Y, with particular preference being accorded zeolite Y.

For use in hydrocarbon conversion processes such as catalytic cracking, it is desirable to reduce the initial alkali metal content of the crystalline aluminosilicate zeolites by replacing their alkali metal content with other metals or hydrogen-containing components which promote the desired conversion reaction. Typically, the alkali metal, e.g., sodium, content is reduced to levels below 10 wt. %, preferably below 4 wt. % and more preferably below 2 wt. %. Reduction of alkali metal content is readily accomplished in accordance with well known techniques by ion-exchange procedures wherein a desired cation is introduced into the zeolitic structure to replace the alkali metal cation initially present. Desirable cations include calcium, magnesium, hydrogen, lithium, manganese, lanthanum, cerium, and mixtures of the rare earth metals, etc. In accordance with the invention, at least a portion of the alkali metal content of the second zeolite component of the catalyst composition is replaced with rare earth metal cations. The rare earth metal content of the zeolite may range from 0 to 22 wt. % as oxides based on the weight of the rare earth metal-containing zeolite. Preferably, the rare earth metal content of the zeolite will be in the range of 14 to 22 wt. % expressed as oxides.

A wide variety of rare earth compounds can be employed as the source of rare earth ions. Operable compounds include rare earth chlorides, bromides, iodides, nitrates, acetates, sulfates, formates, and the like. The only limitation on a particular rare earth metal salt or salts employed is that it be sufficiently soluble in the fluid medium in which it is used to give the necessary rare earth ion transfer. The preferred rare earth salts are the chlorides, nitrates, and sulfates. Representative of the rare earth metals are cerium, lanthanum, praseodymium, neodymium, promethium, samarium, europium, gadolinium, terbium, dysprosium, holmium, erbium, yttrium, thulium, scandium, and lutecium. The rare earth metal salt employed can either be the salt of a single rare earth metal or mixtures of rare earth metals, such as rare earth chlorides or didymium chlorides. As hereinafter referred to, a rare earth chloride solution is a mixture of rare earth chlorides consisting essentially of the chlorides of lanthanum, cerium, neodymium, and praseodymium with minor amounts of samarium, gadolinium and yttrium. Rare earth chloride solutions are commercially available such as a mixture containing the chlorides of rare earth having the approximate composition cerium (as $CeO_2$) 48 percent by weight, lanthanum (as $La_2O_3$) 24 percent by weight, neodymium (as $Nd_2O_3$) 16 percent by weight, praseodymium (as $Pr_2O_3$) 5 percent by weight, and lesser amounts of samarium, gadolinium, and other rare earth oxides.

As with other exchangeable metal ions, the rare earth metal is preferably incorporated into the crystalline aluminosilicate zeolite by ion-exchange methods as known in the art. In a typical method, an alkali metal crystalline aluminosilicate is base exchanged by contacting with a 5–10% (wt.) rare earth chloride solution at 130°–190° F. for 2–24 hours, filtering, drying and calcining at 750°–1200° F. for 0.5–2.0 hours in ambient air. To achieve higher levels of exchange the process may be repeated. Additional descriptions of methods for incorporating one or more rare earth metals into the zeolite in accordance with the invention are set forth in U.S. Pat. Nos. 3,823,092; 3,609,103; 3,436,357, which are incorporated herein by reference. The rare earth metal content of the crystalline aluminosilicate zeolite will generally be in the range of 0–22 weight percent, preferably in the range of 14–22 weight percent based on the weight of the zeolite.

The aforedescribed CO oxidation promoter which is incorporated into the ultra-stable Y-type zeolite is prepared by known techniques such as ion exchange, impregnation, and vapor deposition. Preferably, the CO oxidation promoter is supported on the ultra-stable zeolite by impregnation or ion exchange with a solution of a compound of one or more of the aforementioned metals in an amount sufficient to provide the desired concentration. For example, an aqueous solution of palladium nitrate and/or chloroplatinic acid and/or platinum tetra-amine dichloride may be contacted with the zeolite to produce a slurry which may thereafter be filtered, dried, calcined, and/or pre-reduced with hydrogen or other suitable reducing agents. The ultra-stable Y-type zeolite will generally contain 500 to 5000 ppm, preferably 1000 to 3500 ppm, of the CO oxidation promoter (on a metal basis) where said ppm are based on the weight of the CO oxidation promoter-containing ultra-stable Y-type zeolite.

For use in petroleum hydrocarbon conversion such as catalytic cracking operations, it is important that the concentration of the components by adjusted to give maximum cracking to desirable products during the cracking operation and maximum conversion to $CO_2$ during the regeneration operation. In other words, the amount of CO oxidation promoter should be neither too high so as to impart significant dehydrogenation activity to the catalyst during catalytic cracking nor too low to promote adequate conversion of CO to $CO_2$ during regeneration. The total catalyst composition of the invention will, therefore, contain 2 to 100, preferably 8 to 50, parts per million (ppm) of the CO oxidation promoter component; 75 to 96, preferably 82 to 95, wt. % of the inorganic porous oxide matrix component; and 4 to 25, preferably 5 to 18, wt. % zeolite where there is sufficient CO oxidation promoter-containing ultra-stable Y-type zeolite and rare earth metal-containing zeolite so that the catalyst composition will contain the aforesaid amount of CO oxidation promoter and 0.8 to 4.5, preferably 1.0 to 3.5, wt. % of rare earth metal (as oxides) or compound thereof, all based on the weight of the total composition. A typical catalyst composition of the invention useful in catalytic cracking of petroleum feedstocks will comprise 0.5 to 5.0, preferably 1.0 to 3.0, wt. % of the CO oxidation promoter-containing ultra-stable Y-type zeolite (where said zeolite contains 500 to 5000 ppm of the CO oxidation promoter), 3.5 to 24.5, preferably 4.5 to 17.5, wt. % of the rare earth metal-containing X- or Y-type zeolite (where said zeolite contains 14 to 22 wt. % of rare earth metal on an $RE_2O_3$ basis) and 75 to 96 wt. % of a clay and/or silica-alumina matrix material. Preferably, the matix will be the silica-alumina containing 10 to 27 wt. % alumina.

Particularly good cracking and carbon monoxide conversion characteristics are exhibited by the catalyst prepared in accordance with the present invention. The catalyst of the invention is prepared by supporting the CO oxidation promoter on the ultra-stable zeolite, and thereafter embedding the supported CO oxidation promoter and the rare earth metal-containing crystalline aluminosilicate zeolite in the inorganic porous oxide matrix, most preferably silica-alumina or clay. Thus, the catalyst of the invention will comprise CO oxidation promoter-containing ultra-stable zeolite particles and rare earth metal-containing zeolite particles embedded in an inorganic porous oxide matrix.

It is desirable to calcine the supported CO oxidation promoter prior to its combination with the rare earth metal exchanged aluminosilicate zeolite and matrix components. Accordingly, the CO oxidation promoter supported on ultra-stable Y-type zeolite is preferably calcined in air at about 750°–1250° F. for several hours, e.g., 2–16 hours, prior to its combination with the rare earth metal-containing zeolite and matrix components. After calcination, if desired, the supported CO oxidation promoter may be reduced with hydrogen at 700°–1000° F. for several hours in accordance with conventional practice. Alternately, the supported CO oxidation promoter may also be reduced with hydrogen prior to calcination in air and subsequent combination with the rare earth metal exchanged zeolite and matrix components.

The supported CO oxidation promoter and rare earth metal exchanged zeolite are thereafter embedded in the aforedescribed inorganic porous oxide matrix. This may be conveniently accomplished by dispersing the rare earth metal exchanged zeolite and the CO oxidation promoter-containing ultra-stable zeolite in a hydrogel of the matrix material to produce a composite which is spray dried, washed free of residual soluble salts and flash dried. For example, rare earth exchanged zeolite Y particles (usually less than about 5 microns) may be dispersed in impure silica-alumina hydrogel or pre-washed silica-alumina hydrogel and thereafter blended with the ultra-stable zeolite particles comprising the metal CO oxidation promoter to produce a composite which is thereafter spray dried, washed and flash dried. If desired, the finished catalyst may also be sulfided in a conventional manner prior to use. Other methods for compositing the components of the invention are known to those skilled in the art and are meant to be included within the scope of this invention.

The feedstocks suitable for conversion in accordance with the invention include any of the well known feeds conventionally employed in hydrocarbon conversion processes. Usually, they will be petroleum derived, although other sources such as shale oil, tar sands oil, and coal are not to be excluded. Typical of such feeds are heavy and light virgin gas oils, heavy and light virgin naphthas, solvent extracted gas oils, coker gas oils, steam-cracked gas oils, cycle oils, deasphalted residua, etc.

For use in hydrocarbon conversion, the catalyst of the invention will be contacted with a hydrocarbon feedstock at a temperature in the range of about 500° to 1000° F., a pressure of 0 to 50 psig, a feed rate of 0.1 to 10.0 V/V/Hr. In a preferred embodiment, the catalyst of the invention will be employed for the catalytic cracking of a hydrocarbon feedstock at a temperature in the range of about 875° to 1000° F., pressure of 0 to 25 psig and a feed rate of 2 to 50 V/V/Hr. The catalytic cracking catalyst composition of the invention may be regenerated at conditions which include a temperature in the range of 1100° to 1400° F., preferably 1150° to 1325° F.

DESCRIPTION OF THE PREFERRED EMBODIMENTS

The following examples further illustrate the present invention. Unless otherwise specified, all percentages and parts are by weight.

EXAMPLE 1

A catalyst of the invention was prepared as follows: 1950 grams of a silica/alumina hydrogel (equivalent to about 177 grams of silica-alumina having an alumina content of 13 wt. %) were blended with 29.9 grams of rare earth exchanged "Linde" zeolite Y (RE-Y) equivalent to 22.0 grams faujasite based on silica and alumina content. The RE-Y zeolite employed herein was prepared by substantially completely exchanging the original alkali metal ions of the zeolite Y with a mixed rare earth chloride solution (about 10 wt. % cerium, 55 wt. % lanthanum, 20 wt. % neodymium, 10 wt. % praseodymium), filtering, drying and calcining the material 2 hours at 1000° F., and then repeating the treatment two more times. The RE-Y zeolite after the final exchange contained 0.99 wt. % $Na_2O$ and 23.4 wt. % mixed rare earth oxides. To the mixture of RE-Y and silica/alumina hydrogel was added 1.0 gram of a CO oxidation catalyst component consisting of about 20 wt. % alumina and about 80 wt. % ultra-stable zeolite Y containing 0.5% Pt and 0.5% Pd by ion exchange based on the total weight of CO oxidation catalyst component. The ultra-stable zeolite Y was prepared by multiple exchanges with ammonium ion solutions interspersed with calcination at about 1000° F. for 2 hours. The composite was oven dried at 230° F., ground and washed free of extraneous salts. The resulting catalyst was calcined in air at 1000° F. It is designated "A" in subsequent examples and comprises about 0.5% of the CO oxidation catalyst component, 11% RE-Y, and 88.5% silica/alumina matrix. The noble metal content of the total composite catalyst "A" is about 25 ppm Pt and 25 ppm Pd.

EXAMPLE 2

This example describes the preparation of another catalyst of the invention. It was made in the manner of Example 1 except the CO oxidation catalyst component consisted of an ultra-stable zeolite Y containing 0.12% $Na_2O$ and having an $SiO_2/Al_2O_3$ mol ratio of 5.86. The ultrastable zeolite Y was base exchanged with an aqueous solution of $Pd(NO_3)_2$ and $H_2PtCl_6$ to incorporate 0.5% Pt and 0.2% Pd into the ultra-stable zeolite. The catalyst of this example is designated "B" and was calcined in air at 1000° F. It contains 0.5% of the CO oxidation catalyst component, 11% RE-Y and 88.5% silica-alumina matrix. The noble metal content of the total catalyst composite is about 25 ppm Pt and 10 ppm Pd.

EXAMPLE 3

Portions of catalysts A and B after heating at 1000° F. were examined for CO oxidation of a simulated flue gas. The gas was passed through a bed of the catalyst at 1150° F. for 8 minutes after which time the product gas was sampled and analyzed by mass spectrometry. The simulated flue gas did not have a stoichiometric $O_2$ content required to convert all CO to $CO_2$. The results given below in Table 1 show that both catalysts A and B were effective for converting CO to $CO_2$.

Table 1

| Gas Components | Feed Gas Mole, % | Flue Gas, Mole % | |
|---|---|---|---|
| | | Catalyst A | Catalyst B |
| $O_2$ | 3.48 | 0.07 | 0.02 |
| CO | 8.53 | 0.00 | 0.00 |
| $CO_2$ | 12.00 | 20.18 | 20.05 |
| $N_2$ | 75.51 | 79.75 | 79.93 |
| % CO Effectively Oxidized | | 100 | 100 |

EXAMPLE 4

Portions of catalysts A and B were steamed at 1400° F. for 16 hours and 0 psig. These catalysts were evaluated for CO oxidation in a manner similar to Example 3 above. The results are given below in Table 2.

Table 2

| Gas Components | Feed Gas, Mole % | Flue Gas, Mole % | |
|---|---|---|---|
| | | Catalyst A | Catalyst B |
| $O_2$ | 3.48 | 0.00 | 0.00 |
| CO | 8.53 | 3.00 | 0.92* |
| $CO_2$ | 12.00 | 19.13 | 19.14 |
| $N_2$ | 75.51 | 76.87 | 79.94 |
| % CO Effectively Oxidized | | 79.5 | 100 |

*Due to $O_2$ deficiency in feed gas, about 1.57 mol % CO should remain stoichiometrically.

The data show that all of the oxygen was used up to effectively oxidize all of the CO with catalyst B and about 80% of it with catalyst A. This indicates that some of the noble metals in catalyst A may have been agglomerated by the steam or interfered with by the alumina and thus rendered less effective (25 ppm Pd in catalyst A vs. 10 ppm Pd in catalyst B).

EXAMPLE 5

Portions of A and B which had been steamed @ 1400° F. for 16 hours at 0 psig were subjected to a fluidized bed cracking operation at 950° F. feeding a 500°–700° F. virgin gas oil over a 2 minute process period. The results are tabulated below in Table 3 and are correlated values at a constant 75% conversion level (wt. % 430° F.−).

Table 3

| | Cat. A | Cat. B | Reference Cat. |
|---|---|---|---|
| W/Hr/W[(1)] | 11.5 | 10.7 | 10.3 |
| Carbon, Wt. % | 2.3 | 2.4 | 1.9 |
| $C_3$- Gas, Wt. % | 6.4 | 6.7 | 7.2 |
| Total $C_4$, Wt. % | 9.7 | 9.8 | 10.5 |
| $C_5$/430° F., Wt. % | 56.6 | 56.1 | 55.4 |

Table 3-continued

|  | Cat. A | Cat. B | Reference Cat. |
|---|---|---|---|
| $H_2$, SCF/B[2] | 55 | 42 | ~30 |

[1]Weight of feed processed per hour per weight of catalyst to give 75% conversion to carbon and 430° F. - product.
[2]Standard cubic feed per barrel of feed.

Reference catalyst in the above table are averaged data for a commercial zeolite catalyst of the same nominal composition but which did not have any noble metals present. The data show that notwithstanding the presence of Pt and Pd, there is no debit in activity and in gasoline yields for the catalysts of the invention.

EXAMPLE 6

Another catalyst of the invention was prepared as follows. 49.6 grams of the ultra-stable zeolite Y (dry basis) of Example 2 was ion-exchanged first with 53 cc of an aqueous solution of platinum tetra-amine dichloride (equivalent to 0.25 gr Pt°), dried at 250° F. and then treated with 50 cc Pd(NO$_3$)$_2$ solution (equivalent to 0.10 gr Pd°), dried at 250° F. and then calcined 3 hours at 1000° F. The treatment incorporated 0.5% Pt and 0.2% Pd into the ultra-stable zeolite Y. In a separate blending vessel 1960 g silica/alumina (13% alumina) hydrogel was composited with the pre-exchanged precalcined RE-Y of Example 1 and with a portion of the above noble metal exchanged ultra-stable zeolite Y. The composite was dried and washed free of extraneous soluble salts. The washed composite catalyst was oven dried at about 225° F. and calcined at 1000° F. The catalyst, designated "C", comprised 10% RE-Y, 89% silica-alumina gel, 1% ultra-stable zeolite Y, 50 ppm Pt and 20 ppm Pd. The noble metals are all associated with the ultra-stable Y-type faujasite.

EXAMPLE 7

The catalyst of this example is also a catalyst of the invention and was prepared by the procedure used as described in Example 6. The composite catalyst was oven dried at 225° F. and calcined at 1000° F. in air. The catalyst, designated "D", comprises 8% RE-Y faujasite, 89% silica-alumina gel, 3% ultra-stable Y faujasite, 50 ppm Pt and 20 ppm Pd. The noble metals are all associated with the ultra-stable Y-type faujasite.

EXAMPLE 8

The catalyst of this example is not a catalyst of this invention. A commercial catalyst comprising about 8.5% RE-Y faujasite and about 91.5% silica-alumina gel was impregnated with diluted platinum tetra-amine dichloride solution, left to soak at ambient temperatures for 4 hours and then oven dried. It was then calcined at 1000° F. for 6 hours in air. The catalyst, designated "E", comprised 50 ppm Pt.

EXAMPLE 9

Catalysts "C", "D", and "E" were each steamed at 1400° F. for 16 hours and 0 psig and examined for CO oxidation of a simulated flue gas as described in Example 3 above. The results are presented in Table 4 below.

The feed gas for catalyst "E" was of slightly different composition than that used for catalysts "C" and "D".

Table 4

| Gas Components | Feed Gas, Mole % | Product Gas, Mole % Catalyst C | Product Gas, Mole % Catalyst D | Feed Gas, Mole % | Product Gas, Mole % Catalyst E |
|---|---|---|---|---|---|
| $O_2$ | 3.68 | 0.00 | 0.02 | 3.41 | 0.15 |
| CO | 7.77 | 0.75[1] | 0.60[1] | 8.39 | 1.58[2] |
| $CO_2$ | 12.01 | 19.50 | 19.65 | 12.10 | 19.40 |
| $N_2$ | 76.54 | 79.75 | 79.73 | 76.10 | 78.87 |
| % CO Effectively Oxidized |  | 9.54 | 97.4 |  | 99.8 |

[1]Stoichiometric excess CO in feed blend is 0.41 mole %.
[2]Stoichiometric excess CO in feed blend is 1.57 mole %.

The data show that all three catalysts were very effective in promoting the oxidation of CO to $CO_2$, with catalysts "C" and "D" of the invention showing essentially quantitative utilization of oxygen in the process period.

EXAMPLE 10

Catalysts "C", "D", and "E" were evaluated for cracking properties under the same conditions as described in Example 5. The catalysts were steamed at 1400° F. before testing. The results are shown below in Table 5 and are correlated values at a constant 75% conversion level.

Table 5

| Catalyst | C | D | E | Reference |
|---|---|---|---|---|
| % RE-Y | 10 | 8 | 8.5 | 11 |
| % Ultra-stable-Y | 1 | 3 | 0 | 0 |
| Pt, ppm | 50 | 50 | 50 | 0 |
| Pd, ppm | 20 | 20 | 0 | 0 |
| At 75% Conversion |  |  |  |  |
| W/Hr./W | 12.8 | 10.8 | 7.7 | 10.3 |
| Carbon, Wt. % | 2.7 | 2.9 | 4.2 | 1.9 |
| $C_3$- Gas, Wt. % | 6.6 | 7.4 | 9.1 | 7.2 |
| Total $C_4$, Wt. % | 9.6 | 10.5 | 11.9 | 10.5 |
| $C_5$/430° F., Wt. % | 56.1 | 54.2 | 49.8 | 55.4 |
| $H_2$, SCF/B | 62 | 71 | 107 | ~30 |

The data show that the catalysts of the invention, "C" and "D" are more active and just as selective to naphtha as the reference catalyst, even though "C" and "D" have lower RE-Y contents. There is a small increase in coke and hydrogen makes noted for "C" and "D" relative to the reference catalyst due to the 70 ppm total noble metals on these catalysts, a level which probably is higher than necessary to effectively promote CO oxidation as shown in Tables 1 and 2 above. Comparing "D" and "E" which are at about the same RE-Y content, the performance of "D" of the invention is much superior in both product selectivity and in activity. Here the increased coke and hydrogen makes and decreased $C_5$/430° F. yields in addition to severely lower activity for "E" show that impregnation of the composite catalyst with noble metal is not a particularly desired way to incorporate the oxidation promoter into the catalyst.

What is claimed is:

1. A catalytic cracking operation comprising:
    (a) contacting hydrocarbon feedstock at cracking conditions with a hydrocarbon conversion catalyst which comprises particles of crystalline aluminosilicate zeolite containing rare earth metal and particles of an ultra-stable Y zeolite containing a CO oxidation promoter, which particles are dispersed on a porous oxide matrix to produce a catalyst containing 0.8 to 4.5 wt. % of a rare earth metal (as oxides) and 2 to 100 ppm of a CO oxidation promoter comprising a metal or a compound of a metal selected from Periods 5 and 6 of Group VIII of the Periodic Table, rhenium, chromium, manganese and combinations thereof, thereby forming cracked products and producing a spent catalyst having carbon deposited thereon, and (b) regenerating said spent catalyst in contact with oxygen at elevated temperature to substantially burn the deposited coke to $CO_2$.

2. A catalytic cracking operation according to claim 1 wherein said CO oxidation promoter is selected from the group consisting of platinum, palladium, rhodium, rhenium, iridium, and combinations thereof.

3. A catalytic cracking operation according to claim 2 wherein said matrix is selected from the group consisting of silica, alumina, magnesia, zirconia, kaolin and montmorillonite, clays and combinations thereof.

4. A catalytic cracking operation according to claim 3 wherein said crystalline aluminosilicate zeolite is an X- or Y zeolite.

5. A catalytic cracking operation according to claim 4 wherein said matrix is silica-alumina.

6. A catalytic cracking operation according to claim 5 wherein said CO oxidation promoter is platinum and/or palladium.

7. A catalytic cracking operation comprising: contacting hydrocarbon feedstock at cracking conditions with a cracking catalyst for promoting the oxidation of CO to $CO_2$ during regeneration of the catalyst by the burning of coke therefrom, the catalyst having been prepared by supporting a CO oxidation promoter selected from Periods 5 and 6 of Group VIII of the Periodic Table, rhenium, chromium, manganese and combinations thereof on an ultra-stable Y zeolite support and dispersing the supported CO oxidation promoter and a rare earth metal exchanged crystalline aluminosilicate zeolite in a porous oxide matrix to produce a catalyst containing 0.8 to 4.5 wt. % of rare earth metal (as oxides) and 2 to 100 ppm of said CO oxidation promoter.

8. A catalytic cracking operation according to claim 7 wherein said CO oxidation promoter is selected from the group consisting of platinum, palladium, rhodium, rhenium, iridium, and combinations thereof.

9. A catalytic cracking operation according to claim 8 wherein said matrix is silica-alumina and said crystalline aluminosilicate zeolite is an X- or Y zeolite.

10. A catalytic cracking operation according to claim 9 wherein said catalyst contains 5 to 50 ppm of platinum and/or palladium.

* * * * *